United States Patent
Lee

(10) Patent No.: US 9,434,410 B2
(45) Date of Patent: Sep. 6, 2016

(54) APPARATUS FOR DETECTING TORQUE AND STEERING SYSTEM HAVING THE SAME

(75) Inventor: Changhwan Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 580 days.

(21) Appl. No.: 13/577,390

(22) PCT Filed: Mar. 15, 2011

(86) PCT No.: PCT/KR2011/001811
§ 371 (c)(1),
(2), (4) Date: Aug. 6, 2012

(87) PCT Pub. No.: WO2011/122775
PCT Pub. Date: Oct. 6, 2011

(65) Prior Publication Data
US 2012/0297916 A1   Nov. 29, 2012

(30) Foreign Application Priority Data
Mar. 30, 2010   (KR) .................. 10-2010-0028663

(51) Int. Cl.
*G01L 3/00* (2006.01)
*G01L 3/02* (2006.01)
*B62D 6/10* (2006.01)
*G01L 3/10* (2006.01)

(52) U.S. Cl.
CPC *B62D 6/10* (2013.01); *G01L 3/104* (2013.01)

(58) Field of Classification Search
CPC ......... G01L 3/10; G01L 3/104; G01L 5/221; G01L 3/101; B62D 6/10
USPC ............. 73/862.333, 862.325, 862.193, 73/862.331, 799, 117.02; 74/492
See application file for complete search history.

(56) References Cited

U.S. PATENT DOCUMENTS

| 2003/0051563 | A1 | 3/2003 | Jin et al. | |
| 2004/0250631 | A1* | 12/2004 | Pattok et al. | 73/862.331 |
| 2008/0314164 | A1* | 12/2008 | Masson | G01L 3/104 |
| | | | | 73/862.333 |

FOREIGN PATENT DOCUMENTS

| CN | 10-1054094 A | 10/2007 |
| DE | 10259082 A1 | 7/2003 |
| JP | 2007-181327 A | 7/2007 |
| JP | 2008-157762 A | 7/2008 |

(Continued)

OTHER PUBLICATIONS

Office Action dated Oct. 31, 2013 in Japanese Application No. 2013-502450.

(Continued)

*Primary Examiner* — Harshad R Patel
*Assistant Examiner* — Brandi N Hopkins
(74) *Attorney, Agent, or Firm* — Saliwanchik, Lloyd & Eisenschenk

(57) ABSTRACT

The present invention relates to a torque measuring device including a stator arranged at an inner surface of a case housing, a magnet distantly arranged with the stator at a predetermined gap, a sensing unit detecting a magnetic field generated between the stator and the magnet, and a non-magnetic stator holder integrally formed with a stator fixture fixed by the stator and a shaft fixture fixed by a shaft, whereby manufacturing cost of the torque measuring device can be minimized, and defects generated in the course of manufacturing process can be minimized.

20 Claims, 2 Drawing Sheets

(56) References Cited

FOREIGN PATENT DOCUMENTS

| | | |
|---|---|---|
| JP | 2009-257793 A | 11/2009 |
| JP | 2010-060458 A | 3/2010 |
| KR | 10-2009-0002876 A | 1/2009 |
| KR | 20-2009-0003513 U | 4/2009 |
| KR | 10-0915264 B1 | 9/2009 |
| WO | WO 2009035266 A2 * | 3/2009 ............ G01L 3/104 |

OTHER PUBLICATIONS

International Search Report in International Application No. PCT/KR2011/001811, filed Mar. 15, 2011.

Office Action dated Aug. 29, 2014 in Chinese Application No. 201180017892.0.

* cited by examiner

APPARATUS FOR DETECTING TORQUE AND STEERING SYSTEM HAVING THE SAME

TECHNICAL FIELD

The teachings in accordance with the exemplary embodiments of this invention relate generally to a torque measuring device used for electric steering apparatus of a vehicle.

BACKGROUND ART

Generally, a power steering system provides assistant steering force to allow a driver to smoothly manipulate a steering handle, since great frictional resistance is applied to a front wheel serving as a steering wheel. The assistant steering force is determined by measuring torque applied to a torsion bar when the steering handle is steered.

In order to measure torque of the steering wheel, various torque measuring devices have been developed and used. Among them, a torque measuring device employing a magnetic field has been largely used since it has advantages in terms of a number of parts and price.

In the torque measuring device employing the magnetic field, a magnet is coupled to a steering handle that is an input shaft, one side of a stator holder fixing a stator is coupled to the input shaft through the torsion bar, and the other side of the stator holder is coupled to an output shaft of a front wheel.

Accordingly, when rotating the steering handle by applying external force to the steering handle, torque is measured by detecting a magnetic field according to a difference between a rotational angle of the magnet coupled to the input shaft and a rotational angle of the stator coupled to the stator holder to rotate together with the output shaft. The assistant steering force is determined based on the measured torque and a motor is driven according to the assistant steering force.

The currently-used torque measuring device employing a magnetic field includes a stator fixed by a second shaft connected to a steering wheel side, a magnet oppositely arranged from a stator tooth and fixed by a first shaft connected to a steering handle side, a sensing unit detecting a magnetic field generated from between the stator and the magnet, and a stator holder fixed by the stator and shafts.

The stator holder includes a stator fixture formed by a non-magnetic plastic injection molding product and a shaft fixture formed by a metal material and having a predetermined strength, where the stator fixture and the shaft fixture are mutually coupled by insert molding.

However, the stator holder has a disadvantage in that manufacturing cost is high due to the fact that the stator fixture and the shaft fixture are mutually coupled by insert molding.

Another disadvantage is that defect rates increase and plastic injection molding products are deformed by temperature when insert molding is performed because metal material and plastic material are insert-molded.

Still another disadvantage is that the metallic shaft fixture and the plastic stator fixture may be separated after the stator holder is manufactured.

DISCLOSURE OF INVENTION

Technical Problem

The present invention is to provide a torque measuring device configured to reduce the manufacturing cost and to minimize generation of defects during the manufacturing process by improving structure of a stator holder.

Technical problems to be solved by the present invention are not restricted to the above-mentioned descriptions, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a torque measuring device, the torque measuring device characterized by: a stator arranged at an inner surface of a case housing; a magnet distantly arranged with the stator at a predetermined gap; a sensing unit detecting a magnetic field generated from between the stator and the magnet; and a non-magnetic stator holder integrally formed with a stator fixture fixed by the stator and a shaft fixture fixed by a shaft.

Preferably, the stator holder is formed with a non-magnetic metal material.

Preferably, the stator fixture of the stator holder includes an accommodating unit accommodated by a body of the stator, and an insertion hole distantly formed at a predetermined gap to a peripheral direction of the accommodation unit to allow stator teeth to be inserted, wherein the shaft holder is extended from a lateral surface of the stator fixture in a cylindrical shape having a diameter smaller than that of the stator fixture.

Preferably, the stator holder is formed with an aluminum material.

Preferably, the stator holder is formed with a zinc material.

Preferably, the stator holder is formed with a non-magnetic metal compound.

Preferably, the stator holder is manufactured by die casting method.

Preferably, the stator includes a first stator fixed at a lateral surface of the stator holder, and a second stator fixed at the other lateral surface of the stator holder, wherein stator teeth of the first and second stators are meshed together distanced at a predetermined space.

In another general aspect of the present invention, there is provided a vehicular steering device, the vehicular steering device, characterized by: a first shaft connected to a steering wheel; a second shaft connected to steering wheels to be connected to the first shaft via a torsion bar; a stator arranged at an inner surface of a case housing; a magnet distantly arranged with the stator at a predetermined gap; a sensing unit detecting a magnetic field generated from between the stator and the magnet; and a non-magnetic stator holder integrally formed with a stator fixture fixed by the stator and a shaft fixture fixed by a second shaft.

Advantageous Effects of Invention

The torque measuring device according to the present invention has an advantageous effect in that a stator fixture and a shaft fixture of stator holder are integrally formed in non-magnetic material to maintain a strength capable of press-fitting a shaft and to minimize the manufacturing cost.

The torque measuring device according to the present invention has another advantageous effect in that the stator fixture and the shaft fixture are integrally formed to minimize generation of defects during manufacturing process and to prevent the stator fixture and the shaft fixture from being separated.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
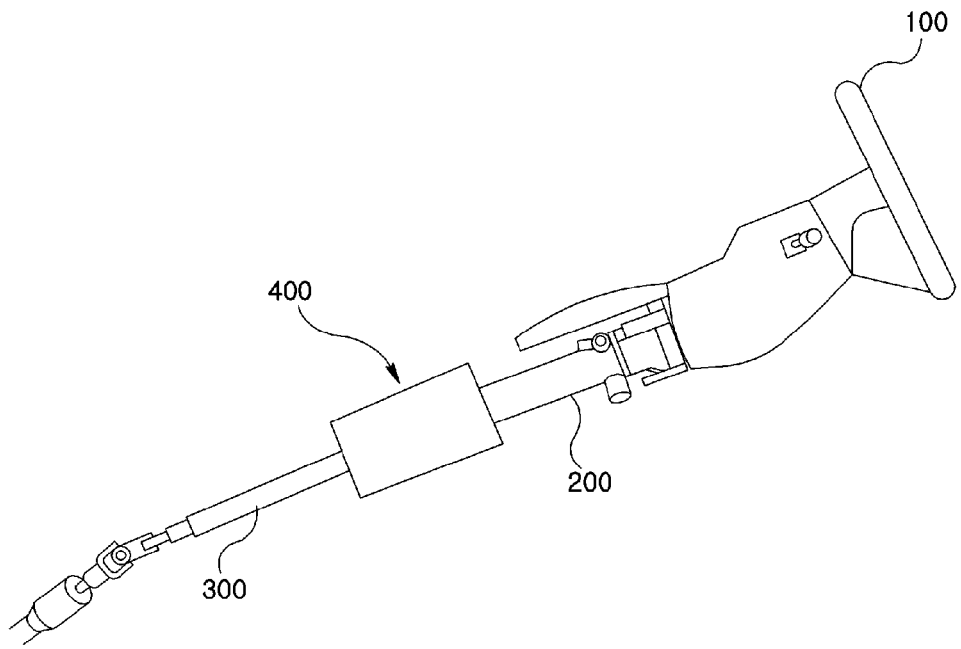
FIG. 1 is a schematic structural view illustrating a vehicular steering device according to the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Furthermore, "exemplary" is merely meant to mean an example, rather than the best.

It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

FIG. 1 is a schematic structural view illustrating a vehicular steering device according to the present invention.

Referring to FIG. 1, the steering device includes a steering wheel (100), a first shaft (200) connected to the steering wheel (100) to rotate along with the steering wheel (100), a second shaft (300) connected to the first shaft (200) via a torsion bar and connected to wheels, and a steering torque measuring device (400) interdisposed between the first and second shafts (200, 300) to measure a steering torque.

Figure 2:
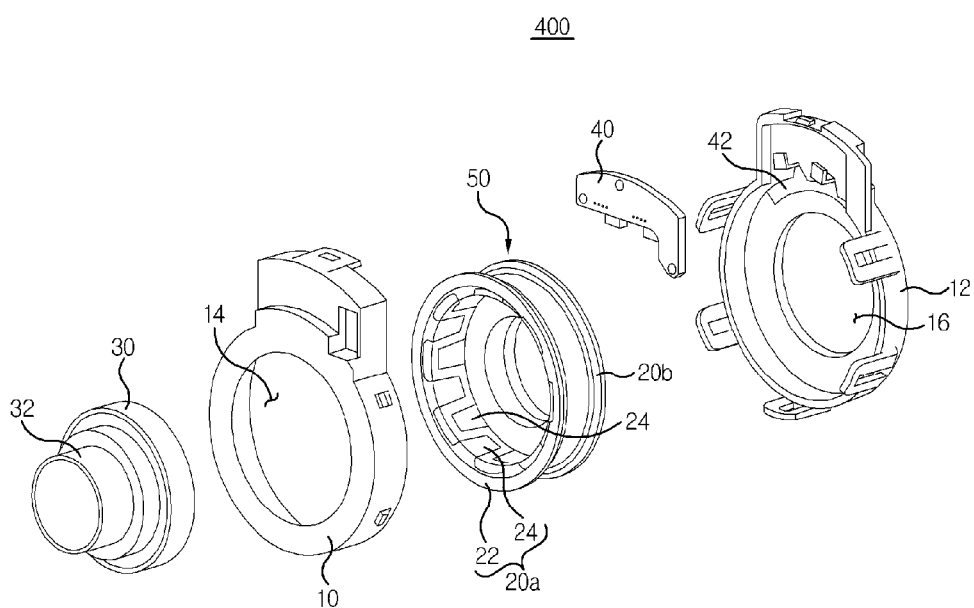
FIG. 2 is an exploded perspective view illustrating a torque measuring device according to an exemplary embodiment of the present invention.
Figure 3:
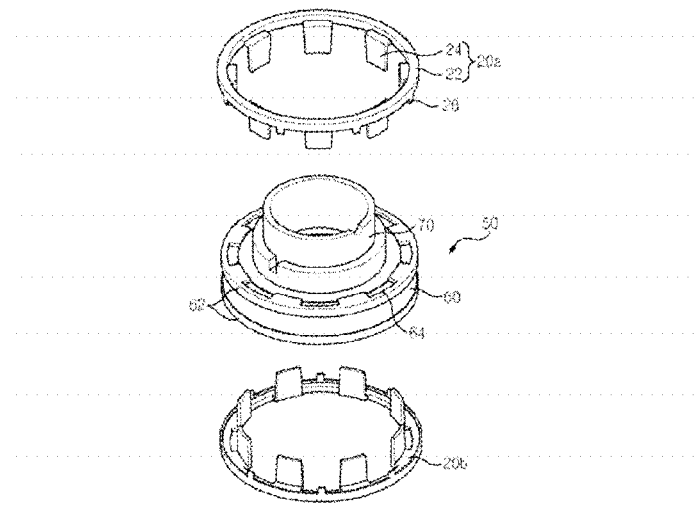
FIG. 3 is an exploded perspective view illustrating a stator according to an exemplary embodiment of the present invention.

FIG. 2 is an exploded perspective view illustrating a torque measuring device according to an exemplary embodiment of the present invention, and FIG. 3 is an exploded perspective view illustrating a stator according to an exemplary embodiment of the present invention.

Referring to FIGS. 2 and 3, the steering torque measuring device (400) includes a case housing, stators (20a, 20b) disposed inside the case housing, a magnet (30) disposed inside the stators (20a, 20b) and a sensing unit (40) detecting magnetic field generated from between the stators (20a, 20b) and the magnet (30).

The case housing includes first and second cases (10, 12) that are interconnected to have a space therebetween. The first case (10) is formed with a first through hole (14) through which the first shaft (200) passes. The second case (12) is formed with a through hole (16) through which the second shaft (300) passes.

The stators (20a, 20b) include a body (22) secured in a ring shape at a periphery of a stator holder (50), and a plurality of stator teeth (24) each formed at an inner circumferential surface of the body (22) at a predetermined space to be coupled to an inner circumferential surface of a stator holder (50). A periphery of the body (22) is formed at a predetermined space with a plurality of fixing pins (26) secured at a periphery of the stator holder (50).

That is, the stators (20a, 20b) are configured in such a manner that a ring-shaped body (22) is accommodated at one side of the stator holder (50), the plurality of teeth (24) is bent each to be arranged at a predetermined space at the inner surface of the stator holder (50), and the plurality of fixing pins (26) is bent each to be accommodated at the periphery of the stator holder (50).

The stators (20a, 20b) are formed in a pair. That is, the stators (20a, 20b) include a first stator (20a) secured at one lateral surface of the stator holder (50), and a second stator (20b) secured at the other lateral surface of the stator holder (50), and the stator teeth (24) of the first and second stators (20a, 20b) are meshed to each other at a predetermined space.

The magnet (30) is inserted into the stator holder (50), arranged opposite to the stator teeth (24) formed at the inner surface of the stator holder (50) at a predetermined space, magnetized to peripheral direction and formed in a ring shape with a plurality of poles.

The magnet (30) is secured at the periphery of a magnet holder (32). The magnet holder (32) is secured by the first shaft connected to the steering wheel that has passed the through hole (14) of the first case (10).

The sensing unit (40) is secured at an inner surface of the cases (10, 12). A metallic collector (42) for focusing the magnetic field generated from the magnet (30) and the stators (20a, 20b) is secured to the inner surface of the cases (10, 12) in order to allow the sensing unit (40) to accurately detect the magnetic field generated from the magnet (30) and the stators (20a, 20b).

Figure 4:
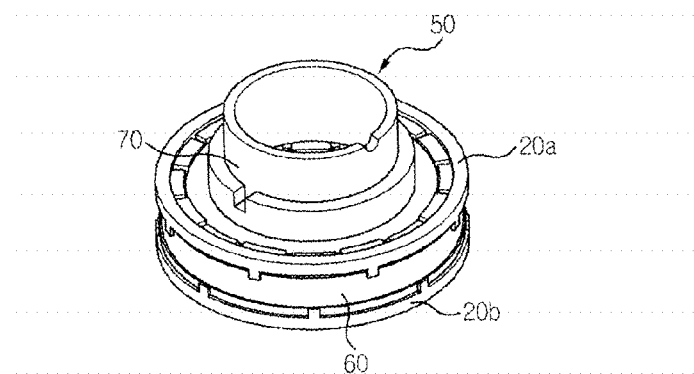
FIG. 4 is a coupled perspective view of a stator according to an exemplary embodiment of the present invention.
Figure 5:
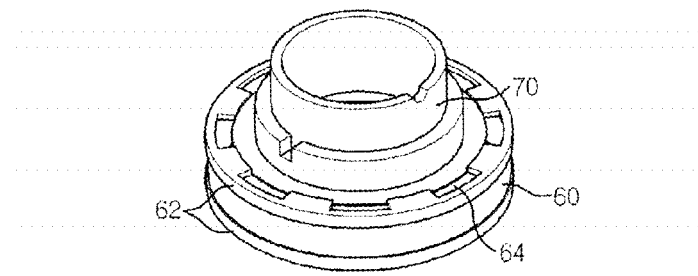
FIG. 5 is a coupled perspective view of a stator holder according to an exemplary embodiment of the present invention.

Referring to FIGS. 3 to 5, the stator holder (50) includes a stator fixture (60) secured by the stators (20a, 20b), and a shaft fixture (70) secured by the second shaft.

The stator fixture (60) is protrusively formed with an accommodation unit (62) for each stator body (22) to be accommodated at each distal end of the periphery, and is formed with tooth insertion holes (64) each at a predetermined space for the state tooth (24) to be circumferentially inserted by the stator teeth (24) and arranged at the inner surface of the stator holder (50). The stator fixture (60) is formed therein with a space in which the magnet (30) can be accommodated.

The shaft fixture (70) is extended from a lateral surface of the stator fixture (60) in a cylindrical shape having a diameter smaller than that of the stator fixture (70).

At this time, the stator holder (50) must be formed with a non-magnetic material to prevent magnetic flux of the stator tooth (24) collecting magnetic flux from leaking, and have a strength higher than a predetermined level to allow the shaft to be inserted. The magnet holder (50) satisfying the condition is formed with non-magnetic metallic material, and is integrally formed with the stator fixture (60) and the shaft fixture (70).

That is, the magnet holder (50) formed with non-magnetic metallic material can prevent magnetic flux of the stator tooth (24) collecting magnetic flux from leaking, and can have a strength strong enough to press-fit the shaft.

Furthermore, the stator holder (50) is such that the stator fixture (60) and the shaft fixture (70) are integrally manufactured by die casting, whereby manufacturing cost can be greatly reduced compared with the stator fixture (60) and the shaft fixture (70) being integrally manufactured by insert molding. Furthermore, defects generated in the course of manufacturing can be minimized, deformation of injection molding products can be prevented, and the metallic shaft fixture and the plastic stator fixture can be prevented from being separated.

The stator holder (50) may be manufactured with an aluminum material, for example, may be manufactured a zinc material and may be manufactured with non-magnetic metallic compound. Furthermore, the stator holder (50) may be manufactured with any non-magnetic metallic material strong enough to press-fit the shaft.

Mode for the Invention

Now, operation of the torque measuring device thus configured will be described.

In a case an external force is applied to the steering wheel to rotate the steering wheel, the first shaft is rotated to rotate the magnet holder (32) secured by the first shaft and the magnet (30).

The first shaft is rotated by receiving a rotational force of the first shaft through the torsion bar, and the stator holder (50) secured by the second shaft and the stators (20a, 20b) are also rotated.

However, the torsion bar is generated with torque by frictional resistance with road and wheels because the second shaft is connected to the wheel side contacting the road. Rotational angles of magnet (30) and the stators (20a, 20b) are differentiated by torque of the torsion bar, and magnetic fields generated by the magnet (30) and the stators (20a, 20b) are differentiated by the rotational angle difference of the magnet (30) and the rotational angle difference of stators (20a, 20b). Therefore, the magnetic field generated by the magnet (30) and the stators (20a, 20b) is detected by the sensing unit (40), whereby the torque can be measured.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to be limited to the examples and designs described herein but is to be accorded the widest scope consistent with the principles and novel features disclosed herein.

INDUSTRIAL APPLICABILITY

The present invention has an industrial applicability in that a stator fixture and a shaft fixture of stator holder are integrally formed in non-magnetic material to maintain a strength capable of press-fitting a shaft and to minimize the manufacturing cost, and the stator fixture and the shaft fixture are integrally formed to minimize generation of defects during manufacturing process and to prevent the stator fixture and the shaft fixture from being separated.

The invention claimed is:

1. A torque measuring device, the torque measuring device comprising:
   a case housing a first case and a second case distantly interconnected with the first case;
   a stator holder disposed in the case housing;
   first and second stators each having a ring-shaped stator body and a plurality of stator teeth formed at an inner circumferential surface of the stator body;
   a magnet inserted into the stator holder, the magnet being respectively arranged in the first and second stators with a predetermined gap; and
   a sensing unit detecting a magnetic field generated between the first and second stators and the magnet;
   wherein the first stator is secured at one lateral surface of the stator holder, and the second stator is secured at another lateral surface of the stator holder;
   wherein the stator holder includes a stator fixture for coupling the first and second stators at opposite ends of the stator fixture;
   wherein a shaft fixture is extended from a lateral surface of the stator fixture;
   wherein the stator fixture and the shaft fixture are integrally formed with the stator holder;
   wherein the stator fixture is protrusively formed with two accommodation units, wherein each of the accommodation units accommodates each of the stator bodies at a distal end of a periphery of the corresponding stator body;
   wherein the stator fixture includes a plurality of insertion holes and wherein each of the plurality of insertion holes has a predetermined position for a stator tooth to be circumferentially inserted; and
   wherein each of the stator teeth of the first stator is meshed with a corresponding stator tooth of the second stator in the predetermined position through a corresponding one of the insertion holes.

2. The torque measuring device of claim 1, wherein the stator holder is formed with a non-magnetic metal material.

3. The torque measuring device of claim 1, wherein the stator fixture further includes tooth insertion holes distantly formed at a predetermined space in a peripheral direction of each of the accommodation units.

4. The torque measuring device of claim 1, wherein the stator holder is formed with an aluminum material.

5. The torque measuring device of claim 1, wherein the stator holder is formed with a zinc material.

6. The torque measuring device of claim 1, wherein the stator holder is formed with a non-magnetic metal compound.

7. The torque measuring device of claim 1, wherein the stator holder is manufactured by die casting method.

8. The torque measuring device of claim 1, wherein each of the stator bodies of the first and the second stator is formed with a plurality of fixing pins at a predetermined space.

9. The torque measuring device of claim 8, wherein each of the plurality of fixing pins is bent to be accommodated at a periphery of the stator holder.

10. The torque measuring device of claim 1, wherein the first and second cases are interconnected to have a space therebetween.

11. A vehicular steering device, the vehicular steering device comprising:
   a first shaft connected to a steering wheel;
   a second shaft connected to the first shaft;
   a case housing a first case formed with a first through hole to pass the first shaft and a second case distantly interconnected with the first case and formed with a second through hole to pass the second shaft;
   a stator holder disposed in the case housing;
   first and second stators each having a ring-shaped stator body and a plurality of stator teeth formed at an inner circumferential surface of each stator body;
   a magnet inserted into the stator holder, the magnet being respectively arranged in the first and second stators with a predetermined gap; and
   a sensing unit disposed at an inner surface of the case housing and detecting a magnetic field generated between the first and second stators and the magnet;
   wherein the first stator is secured at one lateral surface of the stator holder, and the second stator is secured at another lateral surface of the stator holder;
   wherein the stator holder includes a stator fixture for coupling the first and second stators at opposite ends of the stator fixture;
   wherein a shaft fixture is extended from a lateral surface of the stator fixture;
   wherein the stator fixture and the shaft fixture are integrally formed with the stator holder;
   wherein the stator fixture is protrusively formed with two accommodation units, wherein each of the accommodation units accommodates each of the stator bodies at a distal end of a periphery of the corresponding stator body;
   wherein the stator fixture includes a plurality of insertion holes and wherein each of the plurality of insertion holes has a predetermined position for a stator tooth to be circumferentially inserted; and
   wherein each of the stator teeth of the first stator is meshed with a corresponding stator tooth of the second stator in the predetermined position through a corresponding one of the insertion holes.

12. The vehicular steering device of claim 11, wherein the stator holder is formed with a non-magnetic metallic material.

13. The vehicular steering device of claim 11, wherein the stator fixture further includes tooth insertion holes distantly formed at a predetermined space in a peripheral direction of each of the accommodation units.

14. The vehicular steering device of claim 11, wherein the stator holder is formed with an aluminum material.

15. The vehicular steering device of claim 11, wherein the stator holder is formed with a zinc material.

16. The vehicular steering device of claim 11, wherein the stator holder is formed with a non-magnetic metal compound.

17. The vehicular steering device of claim 11, wherein the stator holder is manufactured by die casting method.

18. The vehicular steering device of claim 11, wherein each of the stator bodies of the first and the second stator is formed with a plurality of fixing pins at a predetermined space.

19. The vehicular steering device of claim 18, wherein each of the plurality of fixing pins is bent to be accommodated at a periphery of the stator holder.

20. The vehicular steering device of claim 11, wherein the first and second cases are interconnected to have a space therebetween.

* * * * *